Nov. 10, 1942.   N. E. TOUSLEY ET AL   2,301,479
METHOD OF MAKING A RUBBER OUTLET VALVE
Filed Aug. 2, 1940
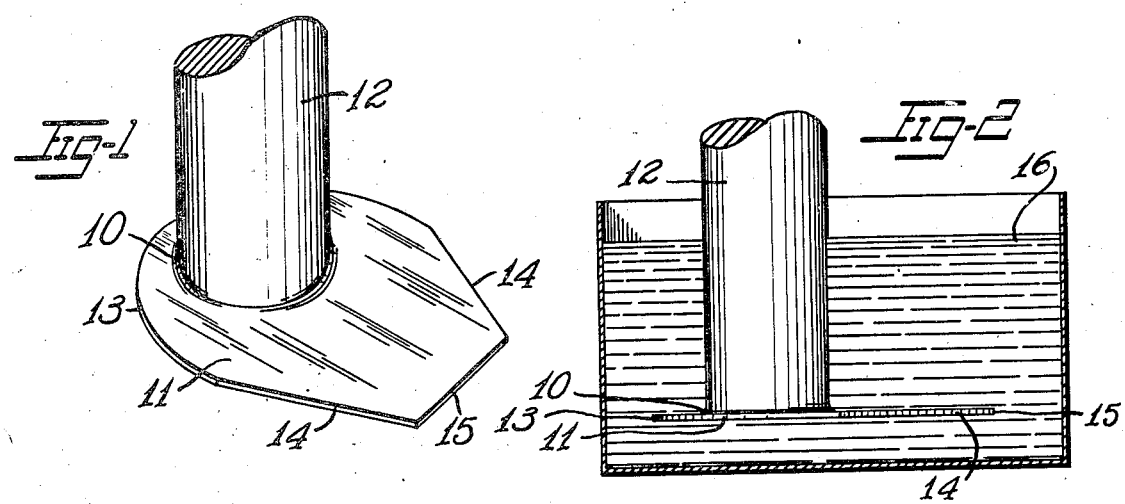
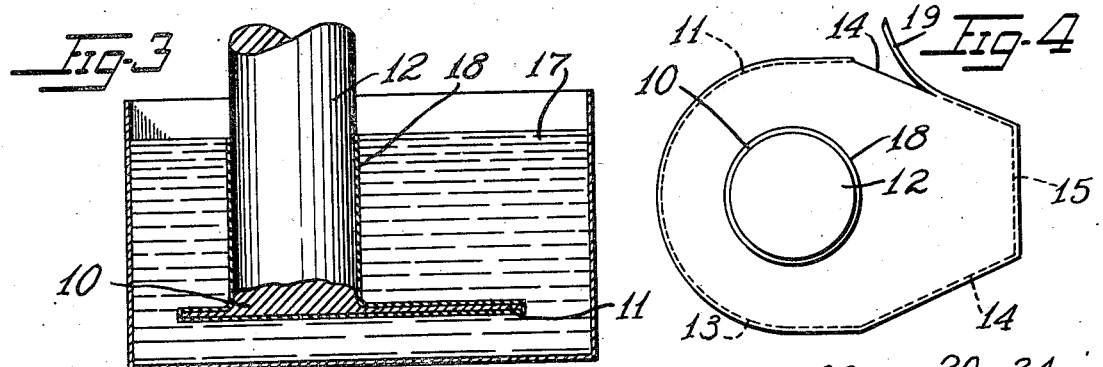
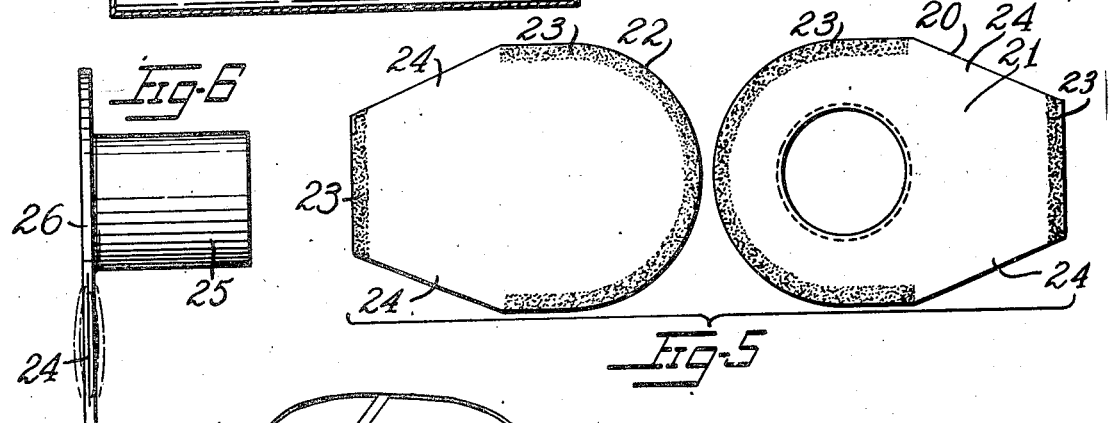
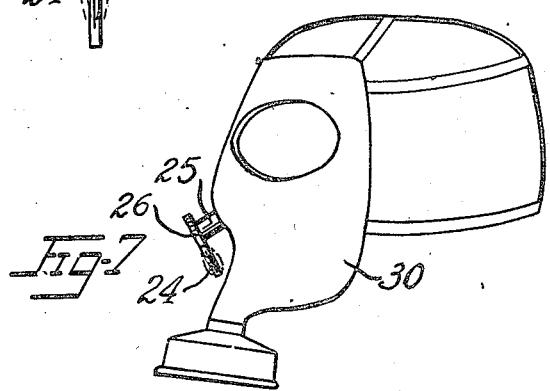
Inventors
Nelson E. Tousley
Warren E. Glancy
Joseph M. Holaday
By Willis F. Avery
Atty Patented Nov. 10, 1942

2,301,479

UNITED STATES PATENT OFFICE 2,301,479

METHOD OF MAKING RUBBER OUTLET VALVES

Nelson E. Tousley, Waban, Warren E. Glancy, Waltham, and Joseph M. Holaday, Belmont, Mass., assignors to The B. F. Goodrich Company, New York, N. Y., a corporation of New York Application August 2, 1940, Serial No. 349,826

4 Claims. (Cl. 18—58)

This invention relates to a method of making rubber outlet valves, particularly those for use on gas masks, and to the valve so produced.

Gas masks, and similar respiratory equipment, require outlet valves which will allow the exit of exhaled gases but which will seal themselves against leakage of inhaled air so that all inhaled air will pass through the attached filters or air cleaners. It is the object of this invention to provide a method for making these outlet valves, and similar one-way valves, cheaply and efficiently, and to produce valves which will operate without leakage and with little back pressure.

Generally, the method of this invention comprises providing a form having a generally planar member with a generally cylindrical member attached thereto and projecting away from the plane of the planar member. This form is coated with rubber, preferably by use of a latex coagulant, such as any of those disclosed in U. S. Patent No. 1,996,090 issued to Edward A. Willson, and latex. The rubber deposit is cut around the edge of the planar member and stripped from the form in the shape of a tube, one end of which progresses into a planar section. To produce the valve a flat section of rubber of substantially equal thickness as the deposited rubber is joined to the planar section around substantially the entire edge of the planar section. Preferably, the portion of rubber removed from the bottom of the planar member is used for this purpose. The two pieces of rubber fit very closely together and the unadhered portions of the edge serve as outlet ports of the valve. This valve, so constructed, permits passage of air outwardly but not inwardly as when the air tends to be drawn inwardly the ports close due to the partial vacuum created in the tube of the valve. The rubber of the valve should be relatively thin so that very little back pressure is exerted on the outwardly moving air and so that the ports of the valve will close easily when there is an attempted inward movement of air.

The invention can best be understood by reference to the accompanying drawing, of which Fig. 1 is a perspective view of a form used in this invention;

Fig. 2 is an elevation, partially in cross-section, showing the form immersed in a latex coagulant;

Fig. 3 is an elevation, partially in cross-section, showing the form immersed in latex coated with a layer of rubber and partially broken away for clarity of illustration;

Fig. 4 is a top elevation of the rubber covered form illustrating the cutting away of the rubber at the edge of the planar member of the form;

Fig. 5 is an elevation showing the two elements of the valve prior to assembly;

Fig. 6 is a side elevation of the finished valve;

Fig. 7 is a side elevation of a gas mask equipped with the outlet valve of this invention.

The method that is preferred for making the valve which is the subject of this invention comprises providing a form 10 comprising a planar member 11 and a cylindrical member 12 attached thereto with its axis at right angles to the plane of the planar member. The planar member 11 is semi-circular around the cylindrical member as indicated at 13 but defined by straight edges 14, 14 where the ports are to be located, and with another straight edge 15 defining the area between the ports. This form is immersed first in latex coagulant 16 (Fig. 2) and then in latex 17 (Fig. 3), or is otherwise coated with rubber to produce an overall coating of rubber 18. The rubber coating is relatively thin, about $\frac{1}{32}$ of an inch, so that it will flex easily. The deposited rubber (Fig. 4) is cut around the edge of the planar section as indicated at 19 to divide the deposit into two portions (Fig. 5), one of the portions, indicated by the numeral 20 is tubular progressing at one end into a planar portion 21, while the other portion 22 is flat. As the planar portion of the form is generally in the shape of the finished valve little trimming is required at this point in the manufacturing operation. The edges of the two portions are coated with rubber cement 23 around substantially the entire edge with two areas 24, 24 along the edge left uncoated to form outlet ports. The two portions of rubber are then adhered together and trimmed to produce the finished valve (Fig. 6).

The outlet valve (Fig. 6) comprises a tubular portion 25 and a planar portion 26 at right angles to the tubular portion. The planar portion contains two ports 24, which open to permit the outward flow of air but close to prohibit the inward flow of air. The valve may be affixed to a gas mask 30 (Fig. 7) and it provides positive control of the breathing of the wearer of the mask so that air is breathed in through the mask's filter and out through the valve.

The forms on which the rubber valves of this invention are made may be of aluminum, porcelain, or any similar material which will be inert chemically to the coagulants into which they are immersed. The term "latex" in this application is intended to include all naturally occurring or artificially prepared dispersions of natural or synthetic elastics such as rubber, balata, caoutchouc, poly-isobutylene, neoprene, and the like. The dispersion used may be thickened, thinned, concentrated, or similarly treated in any way desired and may be compounded with any of the usual compounding ingredients.

Having disclosed herein a method of making an outlet valve of the type used on gas masks it is our desire to protect the invention broadly within the spirit and scope of the appended claims.

We claim:

1. The method of making an outlet valve which comprises forming a rubber deposit comprising a tubular section progressing into a planar section generally at right angles to the axis of the tubular section, said planar section being divided into two thicknesses, cutting the rubber around the edge of the planar section to produce two planar sections, and joining the two planar sections at their edges around substantially the entire edges with a minor portion of the edges left unjoined to form an outlet port for the finished valve.

2. The method of making an outlet valve which comprises providing a form having a planar member and a cylindrical member projecting away from the planar member with the axis of the cylindrical member generally at right angles to the planar member, coating the said form with latex rubber, cutting the rubber deposit around the edge of the planar member to separate the rubber deposit into two pieces, one of which is planar and the other is tubular with an attached planar member, and cementing the two pieces together around substantially the entire edge of the planar members with a minor proportion of the edge left uncemented to form an outlet port for the finished valve.

3. The method of making a valve which comprises forming from flexible material a body comprising a tubular section progressing into a planar section, the planar section being disposed in angular relationship to the tubular section and being divided into two thicknesses, cutting the planar section to separate one thickness thereof from the other, arranging the two separate planar portions in face-to-face relation and joining them together in a localized zone while leaving another zone unjoined to constitute a valve port.

4. The method of making a valve which comprises producing, by deposition from a liquid dispersion of rubber material, a body comprising a tubular section progressing into a planar section, the planar section being disposed in angular relationship to the tubular section and being divided into two thicknesses, cutting the planar section to separate one thickness thereof from the other, then arranging the two separate planar portions in face-to-face relation and joining them together in a plurality of localized zones while leaving a plurality of intervening localized zones unjoined to constitute valve ports.

NELSON E. TOUSLEY.
WARREN E. GLANCY.
JOSEPH M. HOLADAY.